United States Patent [19]
Rogowski et al.

[11] Patent Number: 4,956,397
[45] Date of Patent: Sep. 11, 1990

[54] INSULATING LINER FOR SOLID ROCKET MOTOR CONTAINING VULCANIZABLE ELASTOMER AND A BOND PROMOTER WHICH IS A NOVOLAC EPOXY OR A RESOLE TREATED CELLULOSE

[75] Inventors: Gregory S. Rogowski, Richmond; Thomas F. Davidson, Manassas; Timothy Ludlow, Sterling, all of Va.

[73] Assignee: The United States of America as represented by the Secretary of the Air Force, Washington, D.C.

[21] Appl. No.: 381,541
[22] Filed: Jul. 17, 1989
[51] Int. Cl.⁵ .......................... C08K 3/40; C08K 3/36; C08K 3/22
[52] U.S. Cl. .................................... 523/138; 523/179; 428/418; 428/419; 428/423.1; 428/425.8
[58] Field of Search ................. 523/138, 179; 428/418, 428/419, 423.1, 425.8

[56]  References Cited
U.S. PATENT DOCUMENTS 3,347,047 10/1967 Hartz et al. .......................... 60/253
3,421,970 1/1969 Daly et al. .......................... 161/170
4,492,779 1/1985 Junior et al. ........................ 523/138
4,514,541 4/1985 Frances ................................ 524/514
4,600,732 7/1986 Junior et al. ........................ 523/138

Primary Examiner—John Kight, III
Assistant Examiner—Frederick Krass
Attorney, Agent, or Firm—Charles E. Bricker; Donald J. Singer

[57] ABSTRACT

An improved composition for an insulating liner, or insuliner, for a solid propellant rocket motor, which composition comprises a vulcanizable elastomeric composition comprising a vulcanizable elastomer and about 5 to 25 pph (parts by weight per 100 parts by weight of elastomer) of vulcanizing agents for the elastomer, about 10 to 20 pph of aramid polymer fibers, about 5 to 20 pph of a powder filler selected from the group consisting of silica, iron oxide, titanium dioxide, carbon, milled glass and ceramic clays, and about 10 to 25 pph of a bond promoter selected from the group consisting of treated cellulosic fiber and a multifunctional aromatic epoxy resin.

6 Claims, No Drawings

INSULATING LINER FOR SOLID ROCKET MOTOR CONTAINING VULCANIZABLE ELASTOMER AND A BOND PROMOTER WHICH IS A NOVOLAC EPOXY OR A RESOLE TREATED CELLULOSE

RIGHTS OF THE GOVERNMENT

The invention described herein may be manufactured and used by or for the Government of the United States for all governmental purposes without the payment of any royalty.

BACKGROUND OF THE INVENTION

This invention relates to insulated solid propellant rocket motors. Specifically, this invention relates to an improved insulation/liner, or insuliner, for a solid propellant rocket motor.

The flame temperatures developed in the operation of solid propellant rockets often exceed 5000° F. As the requirement for longer operation of solid propellant rocket engines becomes greater, the need for improved insulation materials to protect the case wall from the extremely high temperatures developed becomes more evident. The insulation must be able to withstand the high temperatures for periods of several minutes. In addition to the flame resistance, the insulation must also withstand erosion which is an action characteristic of combustion products. The primary objective of insulation is protection of the rocket motor casing. The amount of heat that can be tolerated by the motor case depends upon its material and structural design. In many applications, the case temperature must be kept below 300° F. for the duration of the firing. Furthermore, in order to reduce the dead weight of a rocket, the insulation should have as low a density as possible, consistent with the flame and erosion resistance requirements.

A solid propellant grain must be securely fastened in a rocket motor case if problems are to be avoided when the rocket motor is fired. Even when the solid propellant grain appears to be securely bonded to the motor case, problems relating to separation and uncontrolled burning sometimes develop after ignition, and particularly in flight, where the forces caused by acceleration forces and other forces surpass the holding strength of the bonding material between the motor case and the propellant or the holding strength of bonding material between the propellant and liner material.

Currently, state-of-the-art rocket motor development involves a case-bond system which incorporates a liner, insulation, and special surface treatments, together with one or more primer and barrier applications to improve bonding, both to the case and to the propellant grain, and to prevent migration of ingredients out of or into the propellant. As a result, preparing the case-bond system is very complex and time-consuming, which translates into high cost and a strong possibility for poor reproducibility.

Recent advancements in the technology of bonding of composite systems, including propellant case-bond, have suggested the possibility of a single material which can function as both insulator and liner and which requires neither surface treatments to improve bonding nor primers or barriers to improve bonding and/or prevent ingredient migration out of or into the propellant. Such an insulating liner, or insuliner, would, at most, require only a thin coat of primer on the rocket motor case to enhance the insuliner-to-case bond.

One successful method of protecting the structural members of the rocket from hostile conditions was to provide a lining or coating containing asbestos. This type coating is adapted to withstand flame temperatures and the high velocity flow conditions resulting from the combustion of liquid or solid propellants. Such coatings or linings are capable of enduring for a time sufficient to allow complete combustion of the propellant. Asbestos-reinforced elastomeric insulation systems are the subject of Daly et al., U.S. Pat. No. 3,421,970 (Jan. 14, 1969), and Hartz et al., U.S. Pat. No. 3,347,047 (Oct. 17, 1967).

Environmental and health concerns led manufacturers to seek a replacement for asbestos-containing rocket motor case insulation which exhibits an acceptably low erosion rate. Junior et al., U.S. Pat. No. 4,492,779 (Jan. 8, 1985) disclose that a combination of powder filler and aramid polymer fibers may be substituted for asbestos in elastomeric compositions suitable for use as rocket motor case insulation, without loss of the high erosion resistance which characterizes asbestos-reinforced rocket motor case insulation.

Accordingly, it is an object of the present invention to provide insuliner compositions which satisfy the complex performance requirements for present and future solid rocket motors.

Other objects and advantages of the present invention will become apparent to those skilled in the art from a reading of the following disclosure of the invention.

SUMMARY OF THE INVENTION

In accordance with the present invention, there is provided an improved composition for an insulating liner, or insuliner, for a solid propellant rocket motor, which composition comprises a vulcanizable elastomeric composition comprising a vulcanizable elastomer and about 5 to 25 pph (parts by weight per 100 parts by weight of elastomer) of vulcanizing agents for the elastomer, about 10 to 20 pph of aramid polymer fibers, about 5 to 20 pph of a powder filler selected from the group consisting of silica, iron oxide, titanium dioxide, carbon, milled glass and ceramic clays, and about 10 to 25 pph of a bond promoter selected from the group consisting of treated cellulosic fiber and a multifunctional aromatic epoxy resin.

DESCRIPTION OF THE INVENTION

It has been discovered that the incorporation of a bond promoter selected from the group consisting of treated cellulosic fiber and a multifunctional aromatic epoxy resin into a curable elastomeric composition comprising an elastomer, one or more curing agents for the elastomer, one or more powder fillers and aramid polymer fibers, greatly improves the bond between a solid rocket motor propellant and the elastomeric composition.

By the term "elastomer", it is meant any rubber-like substance having some degree of flexibility in the cured, vulcanized, or heat- and pressure-converted state. Examples of suitable elastomers are butyl rubber, butadiene-styrene copolymer rubbers, nitrile rubbers, neoprene rubbers, polyurethane rubbers, polybutadiene rubbers, polyisoprene rubbers, silicone rubbers, fluorosilicone rubbers, chlorosulfonated polyethylene rubbers, polyacrylonitrile rubbers, polysulfide rubbers, as well as various combinations and blends of these rubbers.

In order to have the elastomer crosslink or cure when heat-treated, the elastomeric composition of this invention contains at least one crosslinking agent. Such agents are well known in the rubber field and include such material as sulfur and sulfur-containing compounds such as thiuram sulfides, thiazoles, thiocarbamates and the like, as well as non-sulfur-containing compounds, such as halogen-containing compounds such as 1,4-bis(trichloromethyl)benzene, magnesium oxide, zinc oxide, litharge, peroxides such as benzoyl peroxide, and the like.

Aramid polymers suitable for use in practice of the invention are available commercially from E. I. duPont de Nemours Company, Wilmington, Del., under the registered trademark KEVLAR. These materials are available in a variety of forms, including tow, cord, long fibers of about ¼" length, short fibers, fibrillated fibers, pulp and the like.

The term "powder filler" is intended to mean any powder filler with a particle size, expressed as specific surface area, of about 1 to 200 sq. meter per gram. Suitable powder fillers include silica, iron oxide, titanium oxide, milled glass, carbon and ceramic clay fillers. Silica powder is preferred because of its low cost as well as its relatively low absorption of the pre-cured elastomer, which minimizes drying of the composition during mixing.

The bond promoter may be a treated cellulosic fiber or a multifunctional aromatic epoxy resin. A suitable cellulosic fiber is Santoweb-H, available commercially from Monsanto Rubber Chemicals, 260 Springside Drive, Akron, Ohio. This material is believed to comprise cellulosic fibers treated with a resorcinol-formaldehyde latex composition.

A suitable multifunctional aromatic epoxy resin is ECN-1299, available commercially from Ciba-Geigy, Hawthorne, N.Y. This resin has a methylene-linked polyaromatic backbone with epoxide units attached to certain of the aromatic functionalities. This resin has repeating groups of the formula

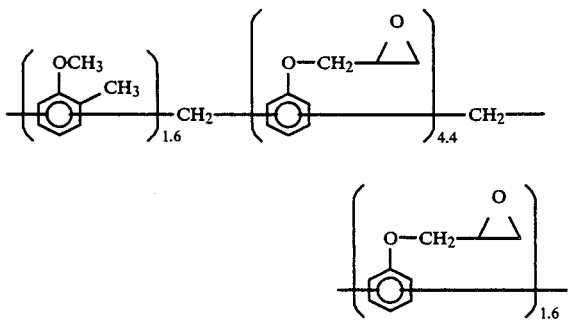

The components of the liner composition of this invention are thoroughly mixed together using a suitable mixer such as, for example, a rubber mill or a Banbury mixer. The final compound is then sheeted to a desired thickness, generally about ⅛" to ¼", using a roll mill, or preferably, a three or four roll calendar mill.

The insulator can be fabricated by a number of techniques. For example, uncured insulator stock can be wound in strips around a mandrel or uncured insulator sheet stock can be layed up on a mandrel and a composite case wound over the layed up, uncured insulator.

The insulator and composite can be then cured together and the mandrel removed in forming the rocket motor casing that carries the cured insulator. Moreover, uncured insulator can be placed on an inflatable mandrel and the mandrel inflated within a preformed rocket motor case and cured to provide the rocket motor casing. In other cases the insulator is cured in a two-piece mold and placed on a mandrel. The composite case is then wound over the insulator-covered mandrel and cured. A series of liner compositions were prepared according to the recipes shown in the following table. All quantities are given in parts by weight.

TABLE I

| Note | | Composition | | | | |
|---|---|---|---|---|---|---|
| | | I | II | III | IV | V |
| a. | Natsyn 2200 | 100 | | | | |
| b. | Viton A | | 100 | 100 | 100 | |
| c. | Hypalon LD999 | | | | | 80 |
| d. | Ricon 150 | | | | | 20 |
| e. | Hisil 233 | 12 | 14 | 14 | 10 | 14 |
| | Kevlar Pulp | 13 | 11 | 11 | 11 | 15 |
| | Zinc Oxide | 4 | | | | |
| | Litharge | | 9 | 9 | 9 | 10 |
| f. | Diak #3 | | 3 | 3 | 3 | |
| g. | HVA | | | | | 2 |
| h. | Vanox | | | | | 2 |
| i. | Varox | 5 | | | | 4.4 |
| j. | Resimene | | | | | 2 |
| | ECN-1299 | 21 | 12 | | | |
| | Santoweb H | | | 12 | 20 | 18 | a. Polyisoprenes, available from Goodyear Tire and Rubber Co., Akron OH.
b. Fluorelastomer, available from E. I. DuPont de Nemours & Co., Wilmington DE.
C. Chlorosulfonated Polyethylene, available from DuPont, supra.
d. 1,2-Polybutadiene, available from Colorado Chemical Specialties, Golden CO.
e. Silica, available from PPG Industries, Inc., Pittsburgh PA.
f. N,N'-Dicinnamylidene-1,6-hexanediamine, available from DuPont, supra.
g. N,N'-m-phenylenedimaleimide, available from DuPont, supra.
h. Butyraldehyde-aniline condensation product, R. T. Vanderbilt.
i. 2,5-dimethyl-2,5-di(t-butylperoxy)hexane, R. T. Vanderbilt
j. Methylene donor, available from Monsanto Rubber Chemicals, Akron OH.

The compositions were mixed, then cured in a plaque mold. Composition I and V were cured for 30 minutes at 325° F. and compositions II–IV were cured for 20 minutes at 340° F. and cooled under pressure prior to removed from the mold.

The mechanical, thermal and bond properties of these compositions were determined as follows:

Mechanical properties were obtained using loop specimens. The samples were tested at −65° F. at a crosshead rate of 10.0 inches per minute. The results are shown in Table II, below.

The thermal properties were obtained by subjecting 4"×4"×0.250" plaques to the flame of an oxygen-acetylene torch. The samples were placed one inch from the torch tip. A thermocouple was placed behind the plaque to measure temperature rise. The torch was operated using an acetylene to oxygen ratio of 1.25:1.0. The rise times (seconds) are given in Table II, below.

Bond properties were determined using ARCADENE 360B, a class 1.3 HTPB plasticized propellant (hereinafter referred to as HTPB), and ARCOCEL 426, a minimum-smoke class 1.1 nitrate ester plasticized/polyester binder propellant (hereinafter referred to as NG), both of which are proprietary compositions of Atlantic Research Corporation, Gainesville Va. The propellants were cast onto cured liner plaques, and cured as necessary. The bond between the plaques and the propellants was measured using a 90° peel test, using an Instron tester at room temperature with a crosshead rate of 1.0 ipm. The bond results, expressed in pli, are given in Table II, below.

TABLE II

| Composition | Torch (sec) | Strain at −65° F. (%) | Bond HTPB (pli) | Bond NG (pli) |
| --- | --- | --- | --- | --- |
| I | 40 | 13 | 4.7 | 2.1 |
| II | 50 | 5.0 | 3.5 | 2.9 |
| III | 42 | 5.3 | 3.5 | 2.3 |
| IV | 46 | 4.0 | 4.2 | 2.5 |
| V | 48 | 5.3 | — | 2.5 |

Various modifications may be made to the invention described above without departing from the spirit thereof.

We claim:

1. In an insulating liner for a solid rocket propellant motor comprising a vulcanizable elastomeric composition, about 5 to 25 parts vulcanizing agents per 100 parts elastomer, about 5 to 20 parts aramid polymer fiber per 100 parts elastomer and about 5 to 20 parts powder filler per 100 parts elastomer, the improvement which comprises about 10 to 25 parts per 100 parts elastomer of a bond promotor selected from the group consisting of celulosic fiber treated with a resorcinol-formaldehyde latex and a multifunctional aromatic epoxy resin having repeating groups of the formula

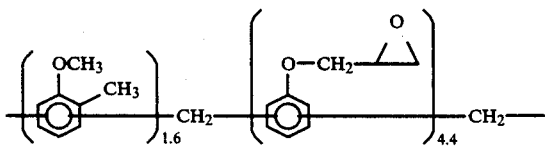

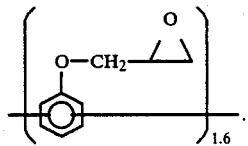

2. The composition of claim 1 containing 100 parts polyisoprene, 12 parts precipitated, hydrated amorphous silica, 13 parts aramid polymer fiber, 4 parts zinc oxide, 5 parts 2.5-dimethyl-2,5-di(t-butylperoxy)hexane and 21 parts of said epoxy resin.

3. The composition of claim 1 containing 100 parts fluoroelastomer, 14 parts precipitated, hydrated amorphous silica, 11 parts aramid polymer fiber, 9 parts lead oxide, 3 parts N,N'-dieinnamylidene-1,6-hexanediamine, and 12 parts of said epoxy resin.

4. The composition of claim 1 containing 100 parts fluoroelastomer, 14 parts precipitated, hydrated amorphous silica, 11 parts aramid polymer fiber, 9 parts lead oxide, 3 parts N,N'-dieinnamylidene-1,6-hexanediamine and 12 parts of said treated cellulosic fiber.

5. The composition of claim 1 containing 100 parts fluoroelastomer, 10 parts precipitated, hydrated amorphous silica, 11 parts aramid polymer fiber, 9 parts lead oxide, 3 parts N,N'-dieinnamylidene-1,6-hexanediamine and 20 parts of said treated cellulosic fiber.

6. The composition of claim 1 containing 80 parts chlorosulfonated polyethylene, 20 parts 1,2-polybutadiene, 14 parts precipitated, hydrated amorphous silica, 15 parts aramid polymer fiber, 10 parts lead oxide, 2 parts N,N'-m-phenylenedimaleimide, 2 parts butyraldehyde/aniline condensation product, 4.4 parts 2,5-dimethyl-2,5-di(t-butylperoxy)hexane, 2 parts methylene donor and 18 parts of said treated cellulosic fiber.

* * * * *